(12) United States Patent
Denpo

(10) Patent No.: US 7,893,949 B2
(45) Date of Patent: Feb. 22, 2011

(54) IMAGE DISPLAY APPARATUS

(75) Inventor: Toshiaki Denpo, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 832 days.

(21) Appl. No.: 11/487,454

(22) Filed: Jul. 17, 2006

(65) Prior Publication Data
US 2007/0024733 A1 Feb. 1, 2007

(30) Foreign Application Priority Data
Jul. 26, 2005 (JP) .............................. 2005-215204

(51) Int. Cl.
G09G 5/00 (2006.01)
(52) U.S. Cl. ...................... 345/619; 345/646
(58) Field of Classification Search .................. 345/646, 345/619
See application file for complete search history.

(56) References Cited

U.S. PATENT DOCUMENTS 5,768,424 A * 6/1998 Long ........................... 382/232
7,400,351 B2 * 7/2008 Zhang et al. ............ 348/240.99
7,424,171 B2 * 9/2008 Matsuzaka .................... 382/275
2003/0193581 A1 * 10/2003 Miyata ...................... 348/231.3
2006/0195464 A1 * 8/2006 Guo ............................ 707/101

FOREIGN PATENT DOCUMENTS
JP 11-313229 11/1999

* cited by examiner

Primary Examiner—Xiao M Wu
Assistant Examiner—Scott E Sonners
(74) Attorney, Agent, or Firm—Banner & Witcoff, Ltd.

(57) ABSTRACT

An image display apparatus having a screen on which a plurality of images are one by one displayed and sequentially switched to another at a time interval. The apparatus includes an image storing portion and a display control portion. The image storing portion stores data of an actual image and data of a thumbnail image of the actual image such that the data of the actual image and the data of the thumbnail image are associated with each other. The display control portion selectively operates in one of a first mode and a second mode depending on information on the data of the actual image stored in the image storing portion. The display controlling portion controls to display, on the screen, an image based on the data of the actual image in the first mode, and an image based on the data of the thumbnail image in the second mode.

15 Claims, 7 Drawing Sheets

IMAGE DISPLAY APPARATUS

INCORPORATION BY REFERENCE

The present application is based on Japanese Patent Application No. 2005-215204, filed on Jul. 26, 2005, the contents of which are incorporated herein by reference.

BACKGROUND OF THE INVENTION

1. Field of the Invention

The present invention relates to an image display apparatus.

2. Description of Related Art

As a kind of an image display apparatus, there is a display unit in an electronic still-camera where a screensaver is installed, as disclosed in JP-A-11-313229. When the display unit operates in a screen-save mode, a plurality of screensaver images are alternately or sequentially presented on a screen of the display unit, that is, a "slide show" is implemented. For instance, the slide show is performed such that two different screensaver images are alternately presented on the screen at intervals of five seconds.

According to the above-described screensaver, an actual image or a thumbnail image corresponding to the actual image is presented as a screensaver image, during a slide show.

Unlike a thumbnail image, an actual image is not a diminished or downsized image. Hence, when a pixel count of an actual image is relatively large, decompression thereof takes much time, delaying changeover of the image presented on the screen. This may give a viewer an impression of unnaturality.

SUMMARY OF THE INVENTION

This invention has been developed in view of the above-described situations, and it is an object of the invention to provide an image display apparatus capable of switching or changing over images at good timings by effectively utilizing thumbnail images in view of a time taken to decompress an actual image, during a slide show or in other situations.

To attain the above object, the invention provides an image display apparatus having a screen on which a plurality of images are one by one displayed and sequentially switched to another at a time interval, which apparatus includes an image storing portion and a display control portion. The image storing portion stores data of an actual image and data of a thumbnail image of the actual image such that the data of the actual image and the data of the thumbnail image are associated with each other. The display control portion selectively operates in one of a first mode and a second mode depending on information on the data of the actual image stored in the image storing portion. The display controlling portion controls to display, on the screen, an image based on the data of the actual image in the first mode, and an image based on the data of the thumbnail image in the second mode.

According to the image display apparatus, the actual image is normally presented on the screen, and the thumbnail image is presented only when presentation of the actual image at the predetermined time interval is impossible. Hence, in a slide show where a plurality of actual images or thumbnail images thereof are presented sequentially, the timing at which the presented image is switched one after another is kept substantially constant, thereby enabling a viewer to view the image presented on the screen without receiving an unnatural impression.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Hereinafter, there will be described several presently preferred embodiments of the invention, by referring to the accompanying drawings.

Figure 1:
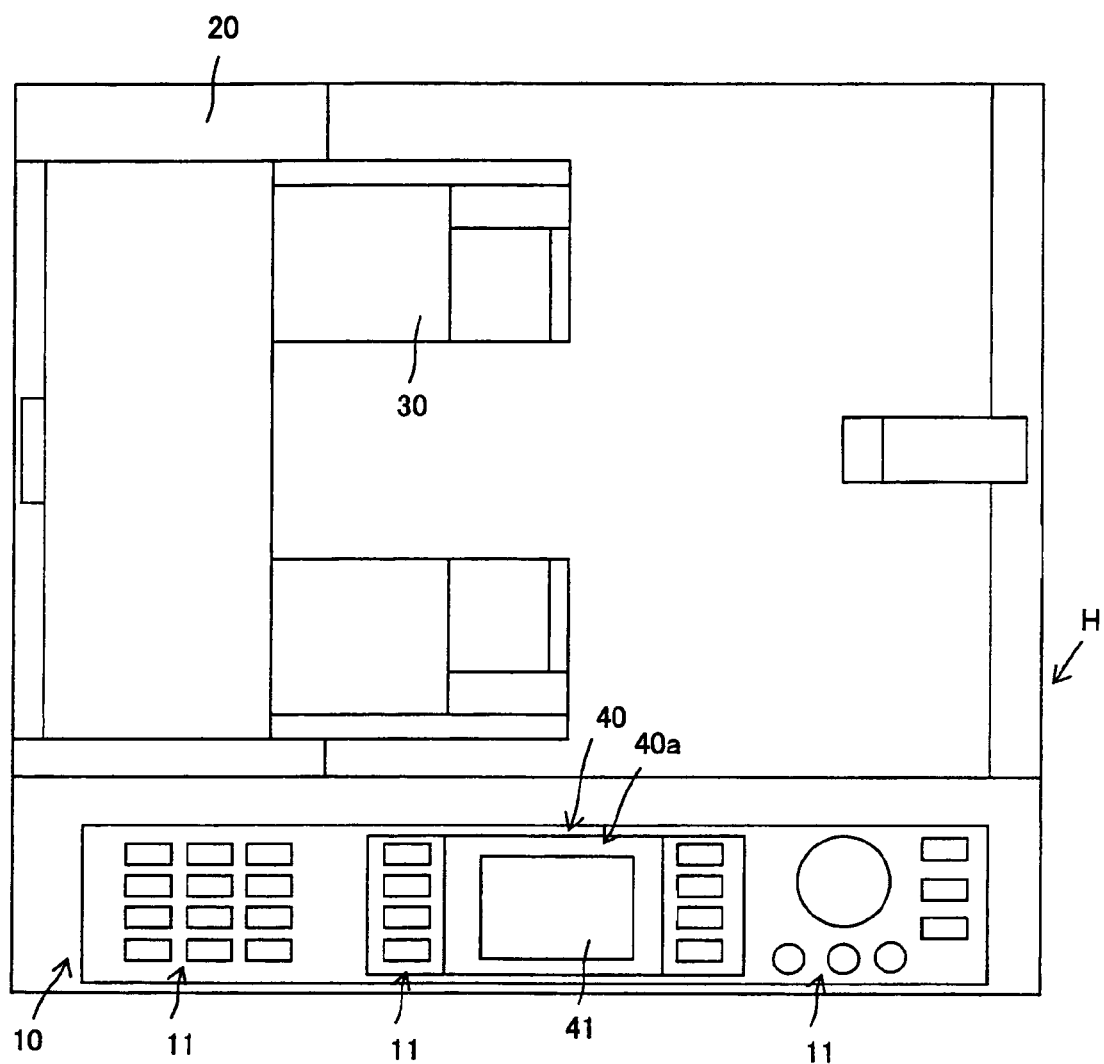
FIG. 1 is a plan view of a multifunction apparatus including an image display apparatus according a first embodiment of the invention.

There will be first described a multifunction apparatus including an image display apparatus according to a first embodiment of the invention, by referring to FIGS. 1-4, in which FIG. 1 is a plan view of the multifunction apparatus.

The multifunction apparatus includes a housing H covering an entirety thereof. At an upper front portion of the housing H, an operator panel 10 is disposed. In an upper portion of the housing H and on the rear side of the operator panel 10, there are disposed a reading portion 20 for reading an image, and a tray 30 from which a document to be read is supplied to the reading portion 20.

At a center of the operator panel 10, a display portion 40 is disposed. On the opposite sides of the display portion 40, there are arranged a number of push-button switches 11.

The display portion 40 has a liquid-crystal panel 40a (as a display) including a display screen 41, a VRAM 42 for storing data of an image to be presented on the display screen 41, and a drive circuit 44 for presenting the image on the display screen 41. The image, data of which is stored in the VRAM, is presented on the display screen 41 of the liquid-crystal panel 40a by operation of the drive circuit 44.

Figure 2:
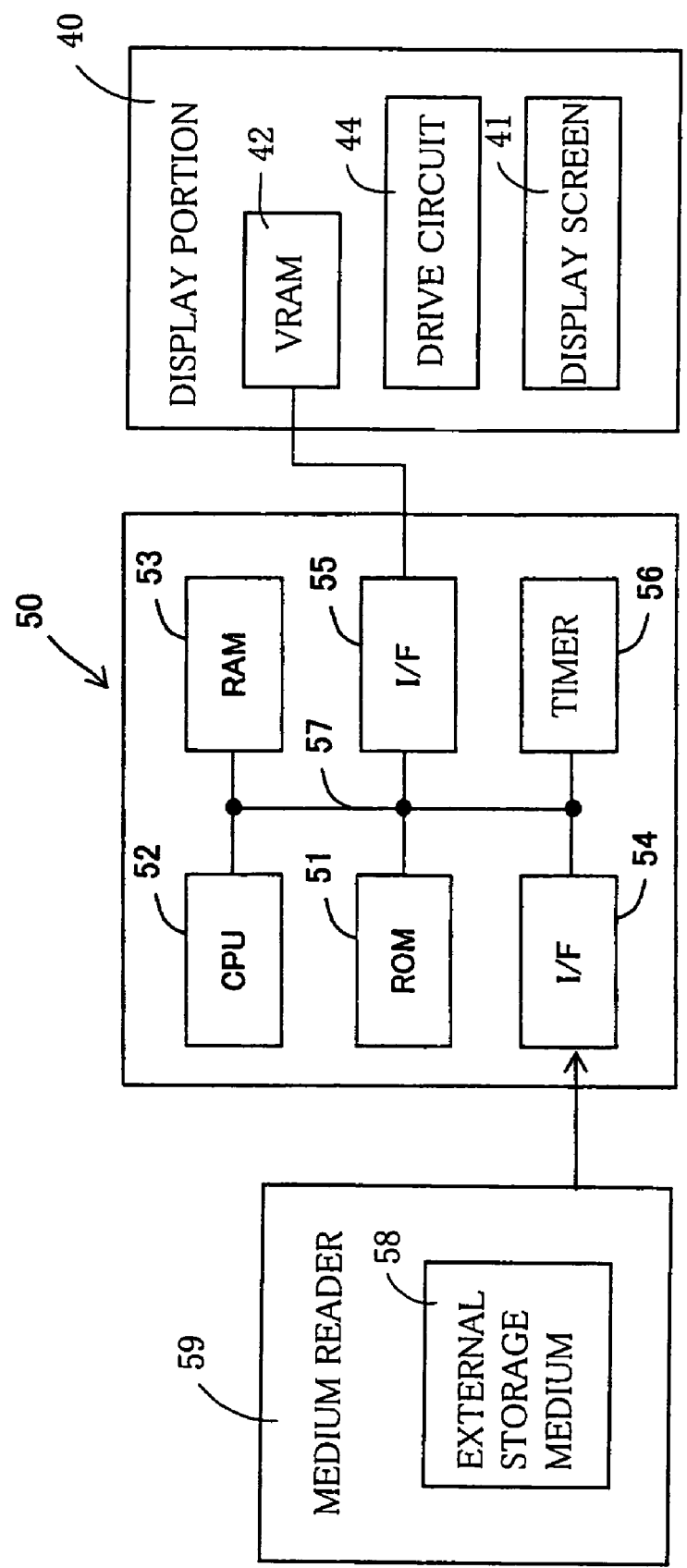
FIG. 2 is a block diagram of the image display apparatus.
Figure 3:
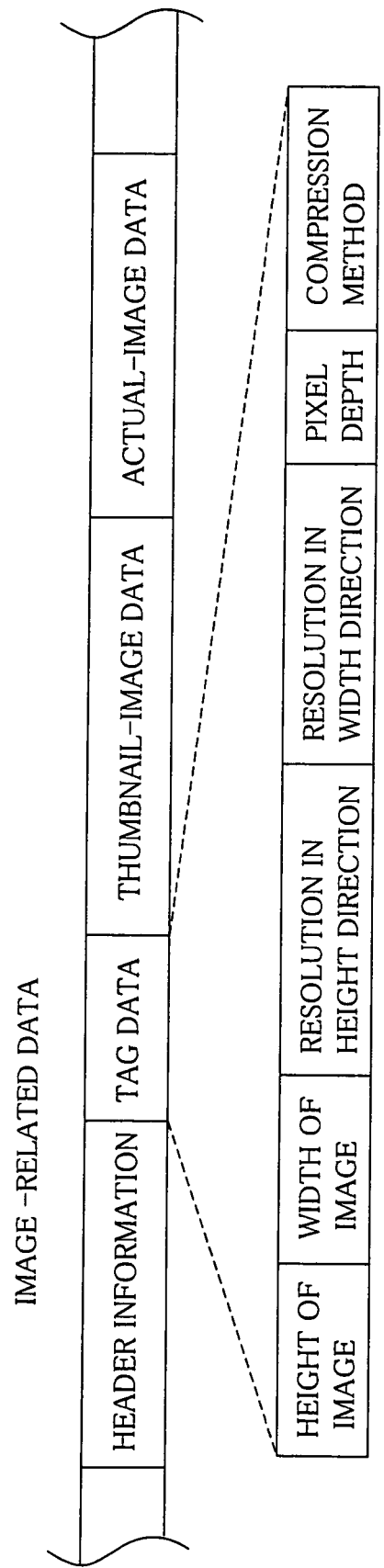
FIG. 3 is a diagram schematically showing a structure of image-related data.

On the other hand, the multifunction apparatus further includes a control unit 50 disposed in the housing H to control general operation of the multifunction apparatus. FIG. 2 is a block diagram of an electronic circuit of the multifunction apparatus. As shown in FIG. 2, the control unit 50 includes a ROM 51 storing a program according to which an operation of the multifunction apparatus is controlled, a CPU 52 for controlling the multifunction apparatus according to the program stored in the ROM 51, a RAM 53 storing various kinds of data, an interface (I/F) 54 through which data stored in an external storage medium 58 and read by a medium reader 59 is input, an interface (I/F) 55 through which a signal is transferred to the display portion 40, and a timer 56 that starts counting, that is, starts incrementing a count T, when the I/F 55 transfers a signal to the display portion 40. The ROM 51, the CPU 52, the RAM 53, the I/F 54, the I/F 55 and the timer 56 are electrically connected to one another through a bus 57. The data stored in the external storage medium 58 includes image-related data of a plurality of images. The image-related data of each image includes header information, tag data, data of a thumbnail image of the image, and data of an actual image of the image, as schematically shown in FIG. 3. The data of the actual image and the data of the thumbnail image are compressed in the JPEG format. To present the actual or thumbnail image on the display screen 41, it is necessary to decompress the data of the actual or thumbnail image. Hereinafter, data of an actual image may be referred to as "actual-image data", and data of a thumbnail image of the actual image may be hereinafter referred to as "thumbnail-image data". The tag data includes data representative of a height and a width of the actual image that are represented in the number of pixels, data representative of a resolution of the actual image in a height direction and a width direction, data representative of a pixel depth, which is the number of bits forming one pixel of the actual-image data and may be referred to as bit depth of each pixel, and data of a compression format or a compression method according to which the actual-image data is compressed.

There will be described operation of the multifunction apparatus. The multifunction apparatus has functions such as a reading function to read an image recorded on a document to capture image-related data of the image, a recording function to record, on a recording medium, an image represented by image-related data, and a displaying function to display an image on the display screen 41 of the display portion 40.

When the reading function is used, an operator first inserts a document leftward (as seen in FIG. 1) into the under side of the tray 30, and manipulates a relevant one of the push-button switches 11 to select the reading function as a function to activate. Then, the multifunction apparatus starts reading the document by using the reading portion 20 while feeding the document. When the reading portion 20 has read the document, the document is ejected rightward (as seen in FIG. 1) onto the upper side of the tray 30.

On the other hand, when the recording function is used, the multifunction apparatus first receives image-related data stored in the external storage medium 58 via the I/F 54. The received data is stored in the RAM 53. An image, image-related data of which is stored in the RAM 53, is recorded on a recording medium by a recording portion (not shown) disposed in the housing H, and the recording medium on which the image has been recorded is ejected frontward from an ejection opening (not shown) formed on the lower side of the operator panel 10.

Figure 4:
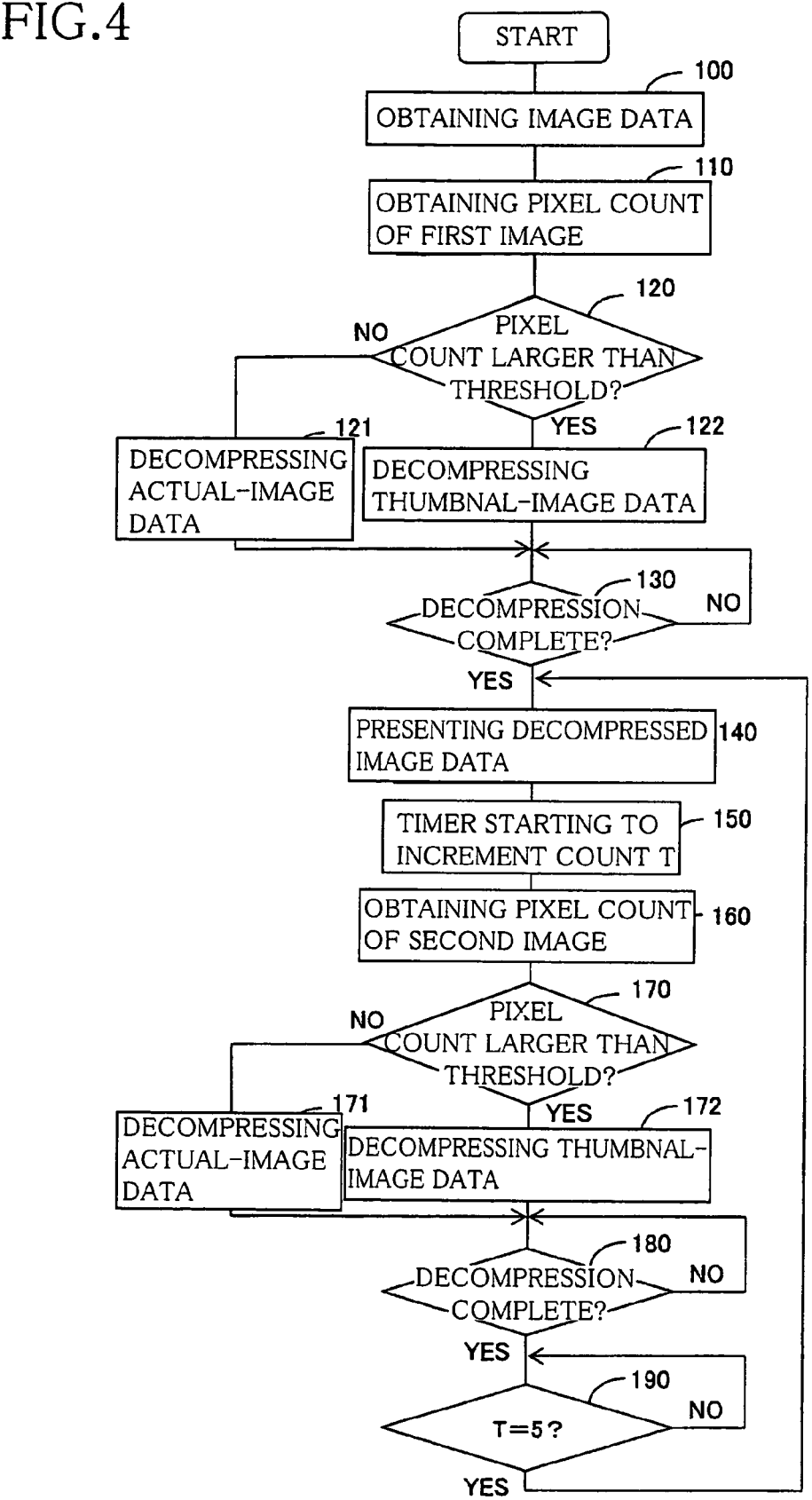
FIG. 4 is a flowchart according to which the image display apparatus operates.

There will be described, with reference to a flowchart of FIG. 4, an operation of the image display apparatus according to the first embodiment, and advantages thereof.

It is assumed that an external storage medium 58, e.g., a memory card, in which image-related data of a plurality of images is stored, is inserted in a loading slot of the medium reader 59.

The above-mentioned program begins with step 100 in which processing to obtain image-related data is implemented. That is, image-related data of images are transferred from the storage medium or the memory card to the RAM 53 via the I/F 54 and the bus 57, and stored therein.

In the next step 110, a pixel count of a first one of the images is obtained. That is, a pixel count of actual-image data of a first one of the images stored in the RAM 53 is calculated based on the tag data of the image-related data of the first image. The pixel count is obtained by multiplying the number of pixels of the actual image in the height direction by the number of pixels of the actual image in the width direction.

Then, in the following step 120, it is determined whether the pixel count obtained in step 110 is larger than a threshold or not. This threshold is set such that when actual-image data of any image in the JPEG format, the pixel count of which is not larger than the threshold, is decompressed, the decompression is complete within a prescribed time period (as described later with respect to step 190).

When the pixel count obtained in step 110 is not larger than the threshold, a negative decision NO is made in step 120, and the processing flow goes to step 121 to decompress the actual-image data. That is, the actual-image data of the first image stored in the RAM 53 is decompressed.

On the other hand, when the pixel count obtained in step 110 is larger than the threshold, an affirmative decision YES is obtained in step 120, and the processing flow goes to step 122 to decompress thumbnail-image data of the first image which data is stored in the RAM 53. A portion of the control unit 50 that implements the above-described steps 121 and 122 and steps 171 and 172 described later, corresponds to a decompresser.

After either of steps 121 or 122, the processing flow goes to step 130 to determine whether the decompression of the actual-image data or the thumbnail-image data is complete. When a negative decision NO is made in step S130, the determination is made again, and this determination is repeated until an affirmative decision YES is made.

When the decompression of one of the actual-image data or the thumbnail-image data is complete and the affirmative decision YES is made in step 130, the processing flow goes to step 140 to display the decompressed actual- or thumbnail-image data. That is, based on the actual-image data decompressed in step 121 or the thumbnail-image data decompressed in step 122, the actual image or the thumbnail image is presented on the display screen 41 of the liquid-crystal panel 40a.

Then, the processing flow goes to step 150 in which the timer 56 starts counting.

In the subsequent step 160, a pixel count of a second one of the images is obtained. That is, a pixel count of actual-image data of a second image stored next to the first image in the RAM 53 is obtained or read out.

Then, the processing flow goes to step 170 to determine whether the pixel count obtained in step 160 is larger than the threshold. When a negative decision NO is made in step 170, the processing flow goes to step 171 to decompress actual-image data of the second image stored in the RAM 53.

On the other hand, when the pixel count obtained in step 160 is larger than the threshold, an affirmative decision YES is made in step 170 and the processing flow goes to step 172 to decompress thumbnail-image data of the second image.

Then, in the subsequent step 180, it is determined whether the decompression of the actual-image data or the thumbnail-image data is complete. When a negative decision NO is made in step 180, this determination is made again. The determination is repeated until an affirmative decision YES is made in step 180.

When decompression of either of the actual-image data or the thumbnail-image data of the second image is complete, an affirmative decision YES is made in step 180. Then, the processing flow goes to step 190 to determine whether the count T of the timer 56 has reached the above-mentioned prescribed time period, that is five seconds in this specific example and corresponds to a time interval ($T_0$). When a negative decision NO is made in step 190, this determination of step 190 is made again. The determination is repeated until the count T of the timer 56 reaches five seconds.

When the count T of the timer 56 finally reaches five seconds, an affirmative decision YES is made in step 190, and the processing flow goes to step 140 to display the decompressed actual- or thumbnail-image data. That is, based on the actual-image data decompressed in step 171 or the thumbnail-image data decompressed in step 172, the actual image of the second image or the thumbnail image thereof is presented on the display screen 41 of the liquid-crystal panel 40*a*.

Thereafter, the processing of steps 140 to 190 is repeated, so that the actual image(s) and/or the thumbnail image(s) are sequentially displayed at the predetermined time intervals $T_0$, in the form of a slide show, on the display screen 41 of the liquid-crystal panel 40*a*.

As described above, according to the present embodiment, when a pixel count of data of an actual image is not larger than the threshold, the actual image is presented on the display screen 41 of the liquid-crystal panel 40*a*. On the other hand, when the pixel count of the actual-image data is larger than the threshold, a thumbnail image of the actual image is presented on the display screen 41.

Therefore, when an image is to be next presented on the screen 41, an actual image of the image is normally selected to be presented, except when the pixel count of data of the actual image is relatively large and decompression of the data of the actual image is supposed to take a long time. In the case where it is supposed that decompression of the actual-image data takes a long time, a thumbnail image of the image is presented on the screen 41, instead of the actual image thereof. Hence, the viewer can view the image presented on the screen 41 without receiving an unnatural impression due to delay of switching of the presented image.

Figure 5:
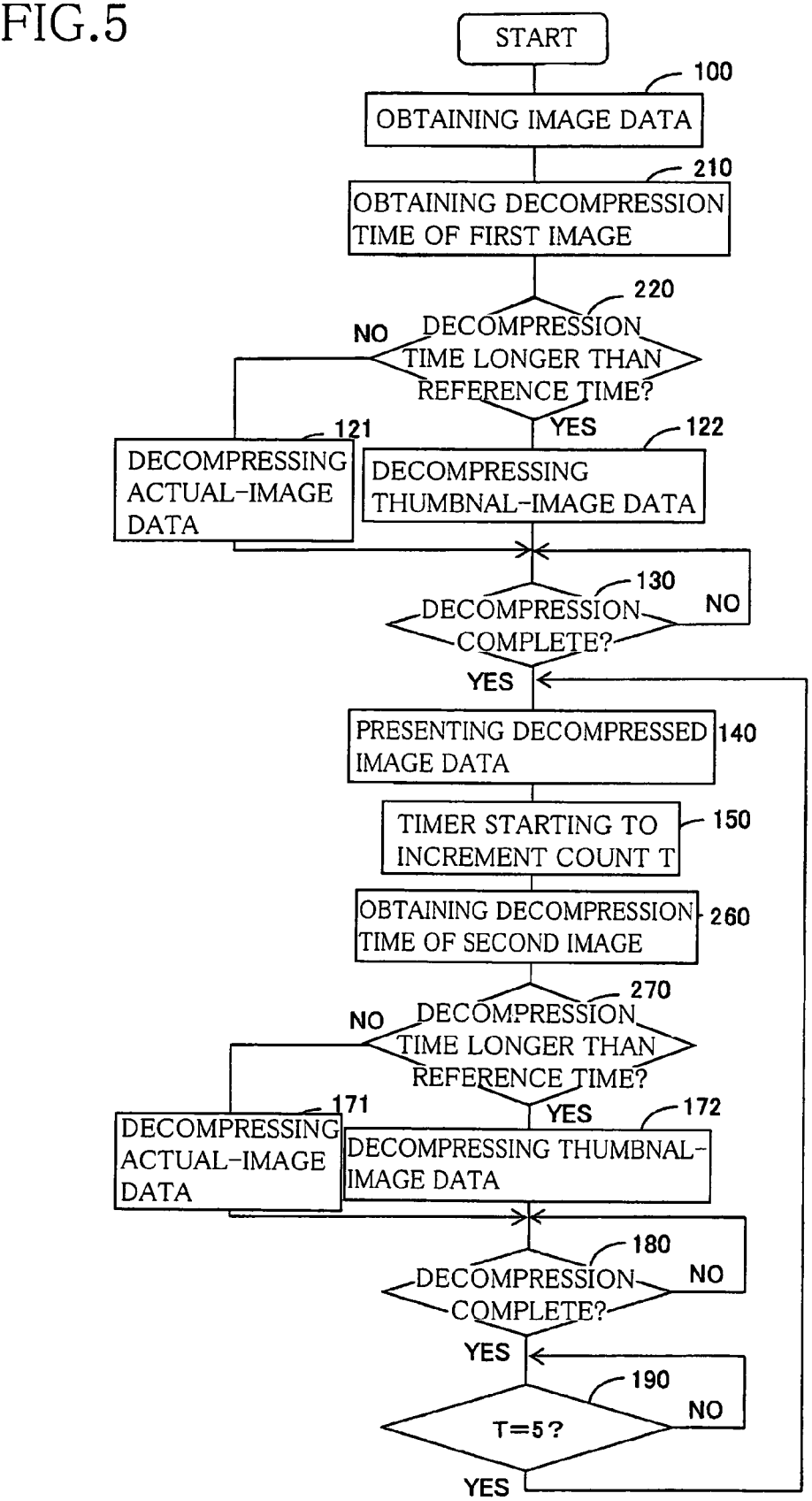
FIG. 5 is a flowchart according to which the image display apparatus according to a second embodiment operates.

There will be now described a multifunction apparatus including an image display apparatus according to a second embodiment of the invention, with reference to FIG. 5 that is a flowchart according to which the image display apparatus of the second embodiment operates. This flowchart is the same as that of FIG. 4, except steps 210, 220, 260 and 270. That is, in the first embodiment, the pixel count of the actual-image data is used as a processing-time corresponding quantity, which is a quantity corresponding to a time required to process the actual-image data of the image to present the actual image on the display screen 41. In the second embodiment, on the other hand, a decompression time, which is a time required to decompress the actual-image data that is compressed image data, is used as the processing-time corresponding quantity. Since the other part of the second embodiment is identical with the first embodiment, the corresponding parts or elements are designated by the same reference numerals as those in the first embodiment and description thereof is omitted.

According to the second embodiment, in steps 210 and 260, a decompression time is obtained from tag data included in image-related data. This decompression time is influenced by a pixel count of actual-image data, a pixel depth, and a compression format or compression method according to which the actual-image data is compressed. As mentioned above in the description of the first embodiment, the tag data includes data representative of a height and a width of the actual image, data representative of a resolution of the actual image in a height direction and a width direction, data representative of the pixel depth of the actual image, and data of the compression method of the actual image. Meanwhile, a ROM 51 stores decompression-time tables for respective combinations of the pixel depth and the compression method. Where the height and the width of the actual image are represented by the number of pixels, rows and columns of each decompression-time table indicate pixel counts of actual image in the height direction and the width direction, respectively, so that the decompression time of each actual image is obtained from a relevant one of the decompression-time tables and based on the numbers of pixels in the height and width directions of the actual image.

In each of the subsequent steps 220 and 270, it is determined whether the decompression time is longer than a reference time. The reference time is set at a value slightly shorter than five seconds that is a time interval compared with a count T of a timer 56 in step 190, so as to ensure that as long as an affirmative decision YES is made in both steps 220 and 270, images based on actual-image data are presented on the display screen 41, each for five seconds, that is, the image presented on the screen is switched from an actual image of a first image to that of a second image after the actual image of the first image has been presented for five seconds.

Figure 6:
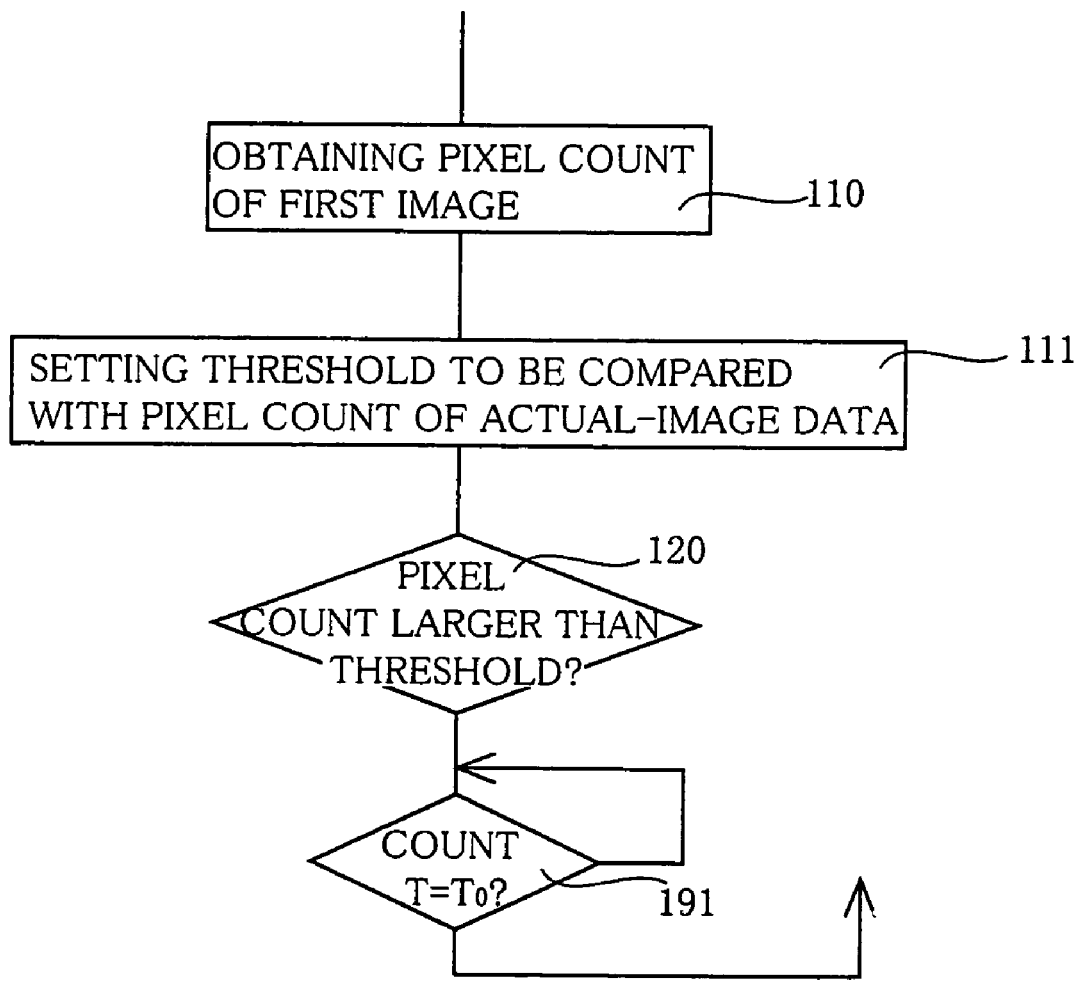
FIG. 6 is a portion of a flowchart according to which the image display apparatus according to a third embodiment operates.

There will be now described a multifunction apparatus including an image display apparatus according to a third embodiment of the invention, with reference to FIG. 6 that is a flowchart according to which the image display apparatus of the third embodiment operates. This flowchart is the same as that of FIG. 4, except that step 111 is added between steps 110 and 120, and step 191 is implemented in place of step 190. That is, in the third embodiment, the time interval $T_0$ at which the image presented on the screen display 41 is switched is changeable. The threshold to be compared with the pixel count of the actual-image data is changed depending on the time interval $T_0$. Where the time interval $T_0$ is short, the threshold is set at a smaller value as compared to a case where the time interval $T_0$ is long. It may be arranged such that the time interval $T_0$ is selected among a plurality of stepwise predetermined values. Alternatively, the time interval $T_0$ may be continuously changeable. In the former case, it is desirable that the threshold set in step 111 to be compared with the pixel count is selectable among a plurality of stepwise predetermined values. In the latter case where the time interval $T_0$ is continuously changeable, it is desirable that the threshold is also continuously changeable. However, it may be arranged such that one of two values is selected as the threshold, depending on whether the time interval $T_0$ exceeds a reference time or not. That is, when the time interval $T_0$ is not longer than the reference time, the threshold is set at a first value, and when the time interval $T_0$ is longer than the reference time, the threshold is set at a second value.

By thus changing the threshold depending on the time interval $T_0$, as many as possible fine actual images can be presented on the display screen.

Figure 7:
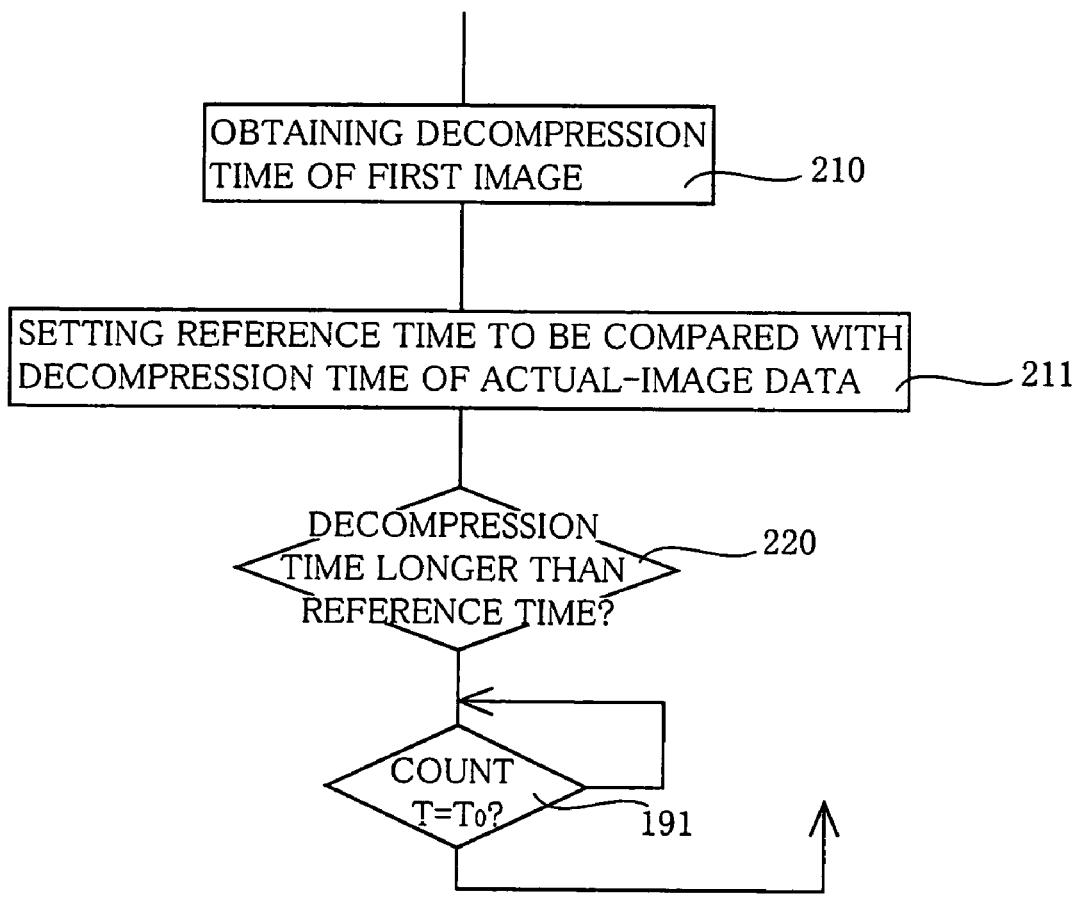
FIG. 7 is a portion of a flowchart according to which the image display apparatus according to a fourth embodiment operates.

There will be now described a multifunction apparatus including an image display apparatus according to a fourth embodiment of the invention, with reference to FIG. 7 that is a flowchart according to which the image display apparatus of the fourth embodiment operates. This flowchart is the same as that of FIG. 5, except that step 211 is added between steps 210 and 220, and step 191 is implemented in place of step 190. The difference between the third and fourth embodiments is that the processing-time corresponding quantity that is changeable and set depending on the time interval $T_0$ is the decompression time. The other part of the fourth embodiment is identical with the third embodiment, and thus the corresponding parts or elements are designated by the same reference numerals and description thereof is omitted.

Although there have been described several embodiments of the invention, it is to be understood that the invention is not limited to the details of the above-described embodiments, but may be otherwise embodied with various modifications and improvements that may occur to those skilled in the art, without departing from the scope and spirit of the invention defined in the appended claims. For instance, the above-described embodiments may be modified as follows.

That is, although in the first embodiment, image-related data stored in a memory card is transferred to and stored in the RAM 53 in step 100 to be used or processed in the subsequent steps such as steps 121, 122, 171 and 172, the image-related data stored in the memory card may be directly used, without being stored in the RAM 53.

In each of the second and fourth embodiments illustrated in FIGS. 5 and 7, the decompression time may be obtained by calculation. For instance, the decompression time may be obtained by the following expression: the height of an actual image · the width of the actual image · the pixel depth of the actual image · k where k is a coefficient selected depending on the compression method and other factors, and provided that the height and the width of the actual image are represented by the number of pixels.

Each of the above-described embodiments may be modified such that the tag data includes data representative of the pixel count of actual-image data.

What is claimed is:

1. An image display apparatus comprising:
   a screen on which a plurality of images are one by one displayed and sequentially switched to another at a time interval;
   an image storing portion which stores data of an actual image and data of a thumbnail image of the actual image such that the data of the actual image and the data of the thumbnail image are associated with each other;
   a judging portion which judges, when a display of one of the plurality of the images is switched to another, which one of an image based on the data of the actual image stored in the image storing portion and an image based on the data of the thumbnail image stored in the image storing portion is to be displayed on the screen; and
   a display control portion which selectively operates, based on a result of the judgment by the judging portion, in one of a first mode in which the image based on the data of the actual image is displayed on the screen and a second mode in which the image based on the data of the thumbnail image is displayed on the screen,
   wherein the image storing portion stores information on the data of the actual image including a processing-time corresponding quantity, which is a quantity corresponding to a time length taken to process the data of the actual image to display the actual image on the screen,
   and wherein the judging portion performs the judgment based on a comparison of at least a threshold and the processing-time corresponding quantity.

2. The image display apparatus according to claim 1, wherein the processing-time corresponding quantity includes at least the number of pixels of the actual image,
   and wherein the judging portion performs the judgment based on a comparison of at least the threshold and the number of pixels of the actual image.

3. The image display apparatus according to claim 1, wherein the data of the actual image is compressed image data,
   wherein the processing-time corresponding quantity includes at least a decompression time which is a time length taken to decompress the compressed data of the actual image,
   and wherein the judging portion performs the judgment based on a comparison of at least the threshold and the decompression time.

4. The image display apparatus according to claim 1, wherein the judging portion judges that the image based on the data of the actual image stored in the image storing portion is displayed on the screen when the processing-time corresponding quantity is smaller than the threshold, and judges that the image based on the data of the thumbnail image stored in the image storing portion is displayed on the screen when the processing-time corresponding quantity is not smaller than the threshold.

5. The image display apparatus according to claim 4, wherein the display control portion includes a threshold changer which decreases the threshold when the time interval is short, as compared with a case when the time interval is long.

6. The image display apparatus according to claim 5, wherein the threshold changer includes a stepwise changer which sets the threshold at a first value when the time interval is not longer than a reference time, and sets the threshold at a second value larger than the first value when the time interval is longer than the reference time.

7. The image display apparatus according to claim 5, wherein the threshold changer includes a continuous changer which increases the threshold with increase in the time interval.

8. The image display apparatus according to claim 1, wherein each of the data of the actual image and the data of the thumbnail image is compressed image data,
   and wherein the display control portion includes a decompressor which decompresses the compressed data of at least one of the actual image and the thumbnail image.

9. The image display apparatus according to claim 1, wherein the display control portion includes a timer which counts a specific time after one of the image based on the data of the actual image stored in the image storing portion and the image based on the data of the thumbnail image stored in the image storing portion has been displayed on the screen,
   and wherein when the timer has counted the specific time, the image displayed on the screen is switched to another image.

10. The image display apparatus according to claim 1, wherein each of the data of the actual image and the data of the thumbnail image is compressed image data,
    and wherein the time interval is a time length which is longer than at least one of a time length taken to decompress the compressed data of the actual image and a time length taken to decompress the compressed data of the thumbnail image.

11. The image display apparatus according to claim 5, wherein the threshold changer includes a selecting portion which selects the time interval among a plurality of stepwise values and which selects the threshold among a plurality of stepwise values each corresponding to the time interval.

12. The image display apparatus according to claim 8, wherein the display control portion includes a decompression judging portion which judges whether the decompression of the compressed data of one of the actual image and the thumbnail image by the decompressor is completed or not,
    and wherein the display control portion displays one of the actual image and the thumbnail image after the decompression judging portion has judged that the decompression is completed.

13. An image display apparatus comprising:
a screen on which a plurality of images are one by one displayed and sequentially switched to another at a time interval;
an image storing portion which stores data of an actual image and data of a thumbnail image of the actual image such that the data of the actual image and the data of the thumbnail image are associated with each other;
a judging portion which judges, when a display of one of the plurality of the images is switched to another, which one of an image based on the data of the actual image stored in the image storing portion and an image based on the data of the thumbnail image stored in the image storing portion is to be displayed on the screen; and
a display control portion which selectively operates, based on a result of the judgment by the judging portion, in one of a first mode in which the image based on the data of the actual image is displayed on the screen and a second mode in which the image based on the data of the thumbnail image is displayed on the screen,
wherein the image storing portion stores information on the data of the actual image including a processing-time corresponding quantity, which is a quantity corresponding to a time length taken to process the data of the actual image to display the actual image on the screen,
wherein the judging portion performs the judgment based on a comparison of at least a threshold and the processing-time corresponding quantity,
wherein the image storing portion stores image-related data including tag data enabling acquisition of the processing-time corresponding quantity, in addition to the data of the actual image and the data of the thumbnail image,
and wherein the display control portion includes a processing-time-corresponding-quantity acquirer which obtains the processing-time corresponding quantity based on the tag data, the judging portion performs the judgment based on a comparison of at least a threshold and the processing-time corresponding quantity obtained by the processing-time-corresponding-quantity acquirer.

14. The image display apparatus according to claim 13,
wherein the tag data includes a plurality of pieces of data related to the actual image and respectively representative of a height and a width of the actual image,
and wherein the processing-time-corresponding-quantity acquirer includes a pixel-number acquirer which obtains the number of pixels of the actual image based on said plurality of pieces of data of the actual image.

15. The image display apparatus according to claim 13,
wherein the data of the actual image is compressed image data,
wherein the tag data includes a plurality of pieces of data related to the actual image, and respectively representative of a height, a width, a resolution in a height direction, a resolution in a width direction, a pixel depth, and a compression method, of the actual image,
and wherein the processing-time-corresponding-quantity acquirer includes a decompression-time acquirer which obtains decompression time, which is a time taken to decompress the compressed data of the actual image, based on at least said plurality of pieces of data related to the actual image.

* * * * *